US012011091B2

(12) United States Patent
Zheng

(10) Patent No.: US 12,011,091 B2
(45) Date of Patent: Jun. 18, 2024

(54) MULTIFUNCTIONAL VIBRATION EQUIPMENT WITH LESS NOISE

(71) Applicant: GUANGDONG NUOJIANG HEALTH TECH. CO., LTD., Dongguan (CN)

(72) Inventor: Sheng-Ju Zheng, Dongguan (CN)

(73) Assignee: GUANGDONG NUOJIANG HEALTH TECH. Co., LTD., Dongguan (CN)

(*) Notice: Subject to any disclaimer, the term of this patent is extended or adjusted under 35 U.S.C. 154(b) by 622 days.

(21) Appl. No.: 17/241,557

(22) Filed: Apr. 27, 2021

(65) Prior Publication Data

US 2022/0202195 A1 Jun. 30, 2022

(30) Foreign Application Priority Data

Dec. 30, 2020 (CN) ......................... 202011602223.7

(51) Int. Cl.
*A47C 21/00* (2006.01)
*A61H 23/02* (2006.01)

(52) U.S. Cl.
CPC ....... *A47C 21/006* (2013.01); *A61H 23/0254* (2013.01); *A61H 2201/0142* (2013.01)

(58) Field of Classification Search
CPC ............ A61H 23/0254; A61H 2201/00; A61H 2201/0138; A61H 2201/0142
See application file for complete search history.

(56) References Cited

U.S. PATENT DOCUMENTS 3,446,205 A * 5/1969 Minohara .......... A61H 15/0078 601/102
6,890,313 B2 * 5/2005 Kim ................... A61H 15/0078 601/19
7,118,541 B2 * 10/2006 Kim ....................... A61H 15/02 601/102

* cited by examiner

*Primary Examiner* — Fredrick C Conley
(74) *Attorney, Agent, or Firm* — Nitin Kaushik

(57) ABSTRACT

The invention discloses a multifunctional vibration equipment, includes a fixed frame; a movable frame movably arranged relative to the fixed frame; a first driving member arranged on the fixed frame for driving the movable frame moving backwards and forwards relative to the fixed frame; and a rolling guide unit including a fixed base, a movable base, and a roller. The movable base is movably arranged relative to the fixed base, the roller is defined between the fixed and the movable base, the fixed base is arranged on the fixed frame, the movable frame is arranged on the movable base; the fixed base is provided with a first slot, the movable frame is provided with a second slot for cooperating with the first slot, two ends of the roller are respectively accommodated in the first and the second slot, the movable base rolls on the fixed base via the roller.

19 Claims, 6 Drawing Sheets

MULTIFUNCTIONAL VIBRATION EQUIPMENT WITH LESS NOISE

CROSS REFERENCE TO PRIORITY APPLICATIONS

This application claims the benefit of Chinese Application 202011602223.7 for a multifunctional vibration equipment with less noise (filed Dec. 30, 2020 at the China National Intellectual Property Administration, CNIPA). The disclosures of the above applications are incorporated herein by reference.

FIELD OF THE INVENTION

The invention pertains to the field of vibration equipment, particularly to a multifunction vibration equipment with less noise.

BACKGROUND OF THE INVENTION

Physical health is very important to us. Exercise is one of the most important ways to keep healthy. Nowadays, office workers who work in office buildings are prone to obesity. When sitting or standing in the same posture for a long time, and due to lack of time for exercise, too much fat accumulation in the body often leads to obesity, which not only affects the beauty of their shapes, but also easily causes physical diseases.

Most fitness beds in the prior art force the users to exercise up and down by making the bed board vibrate. This type of fitness bed generally vibrates strongly and violently, it is not beneficial to users, it cannot achieve the purpose of allowing users to exercise while sleeping and resting.

Therefore, there is a need to invent a new equipment to solve the above-mentioned problems.

SUMMARY OF THE INVENTION

The purpose of the invention is to solve the problems in the prior art.

In accordance with an aspect of the embodiment, there is provided a multifunctional vibration equipment, includes a fixed frame; a movable frame, the moveable frame is movably arranged relative to the fixed frame; a first driving member, the first driving member is arranged on the fixed frame, the first driving member drives the movable frame to move backwards and forwards relative to the fixed frame; and a rolling guide unit, wherein, the rolling guide unit includes a fixed base, a movable base and a roller, the movable base is movably arranged relative to the fixed base, the roller is defined between the fixed base and the movable base, the fixed base is arranged on the fixed frame, the movable frame is arranged on the movable base; the fixed base is provided with a first slot, the movable frame is provided with a second slot, the second slot cooperates with the first slot, two ends of the roller are respectively accommodated in the first slot and the second slot, the movable base rolls on the fixed base via the roller.

In accordance with another aspect of the embodiment, there is provided a multifunctional vibration equipment, includes a fixed frame; a movable frame, the moveable frame is movably arranged relative to the fixed frame; a first driving member, the first driving member is arranged on the fixed frame, the first driving member drives the movable frame to move backwards and forwards relative to the fixed frame; and a rolling guide unit, wherein, the rolling guide unit includes a fixed base, a movable base and a roller, the movable base is movably arranged relative to the fixed base, the roller is defined between the fixed base and the movable base, the fixed base is arranged on the fixed frame, the movable frame is arranged on the movable base, the movable base rolls on the fixed base via the roller.

In accordance with another aspect of the embodiment, there is provided a multifunctional vibration equipment, includes a fixed frame; a movable frame, the moveable frame is movably arranged relative to the fixed frame; a first driving member, the first driving member is arranged on the movable frame, the first driving member drives the movable frame to move backwards and forwards relative to the fixed frame; and a rolling guide unit, wherein, the rolling guide unit includes a fixed base, a movable base and a roller, the movable base is movably arranged relative to the fixed base, the roller is defined between the fixed base and the movable base, the fixed base is arranged on the fixed frame, the movable base is arranged on the movable frame; the fixed base is provided with a first slot, the movable base is provided with a second slot, the second slot cooperates with the first slot, two ends of the roller are respectively accommodated in the first slot and the second slot, the movable base rolls on the fixed base via the roller.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

The invention will be further described below in details with reference to the figures and embodiments.

Figure 1:
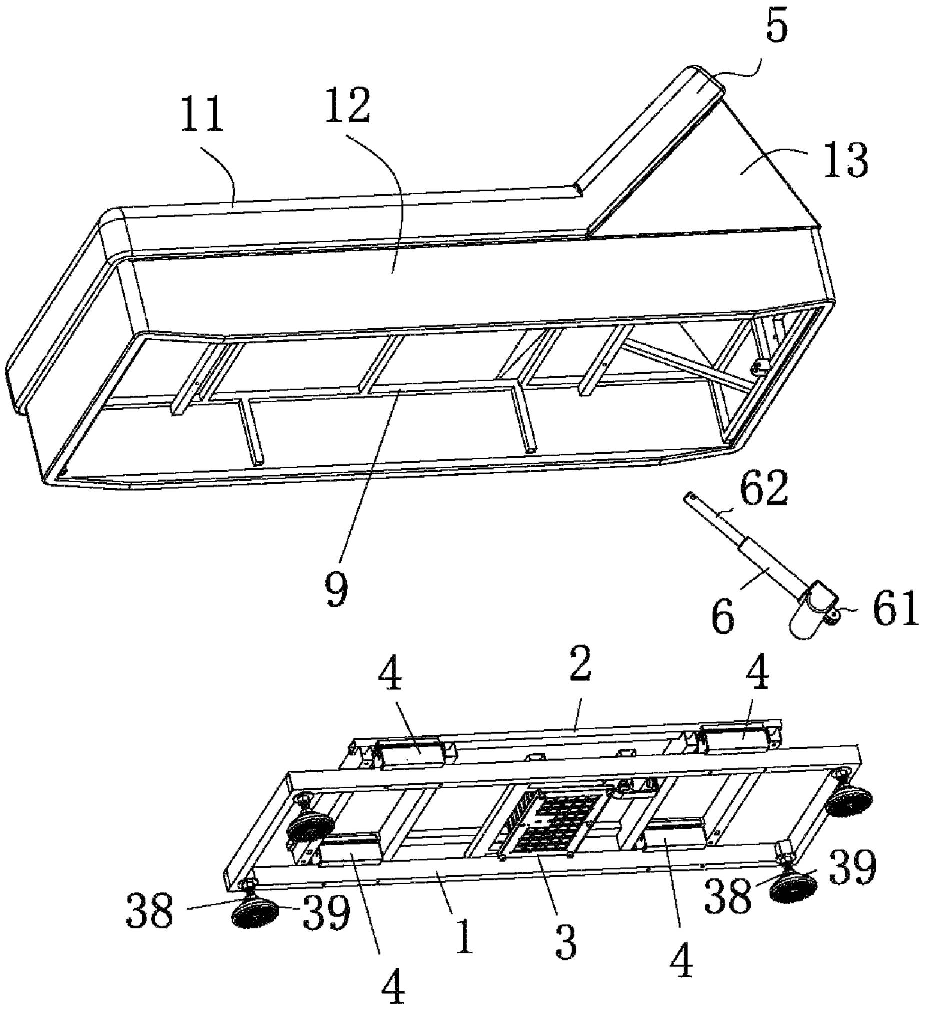
FIG. 1 is a schematic view of the vibration equipment according to an embodiment of the present invention.

As shown in FIG. 1, a multifunctional vibration equipment with less noise in accordance with a preferred embodiment of the present invention comprises a fixed frame 1, a movable frame 2, a first driving member 3, a rolling guide unit 4, a lifting frame 5, a second driving member 6 and a carrying frame 9. In the preferred embodiment, the first driving member 3 is arranged on the fixed frame 1 and/or the movable frame 2. In other embodiments, the first driving member 3 is alternatively arranged on the fixed frame 1. The first driving member 3 drives the movable frame 2 to move backwards and forwards relative to the fixed frame 1. In the preferred embodiment, the fixed frame 1 and the movable frame 2 are substantially rectangular in shape.

Figure 4:
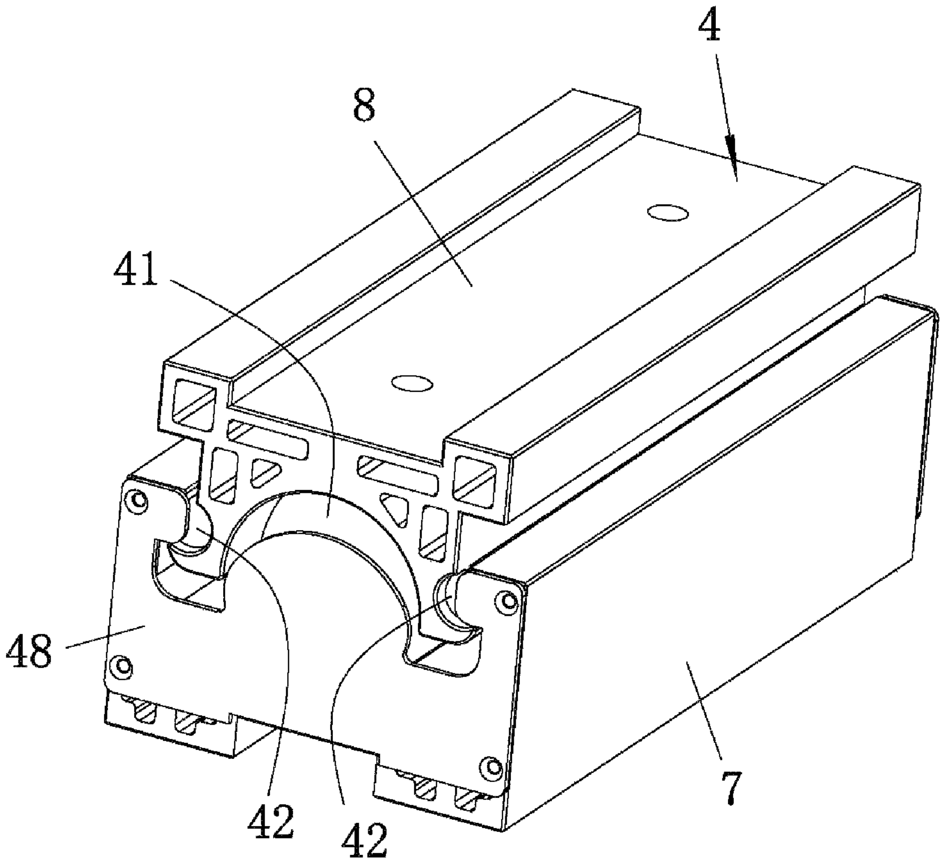
FIG. 4 is a schematic view of the rolling guide unit according to the embodiment of the present invention.
Figure 5:
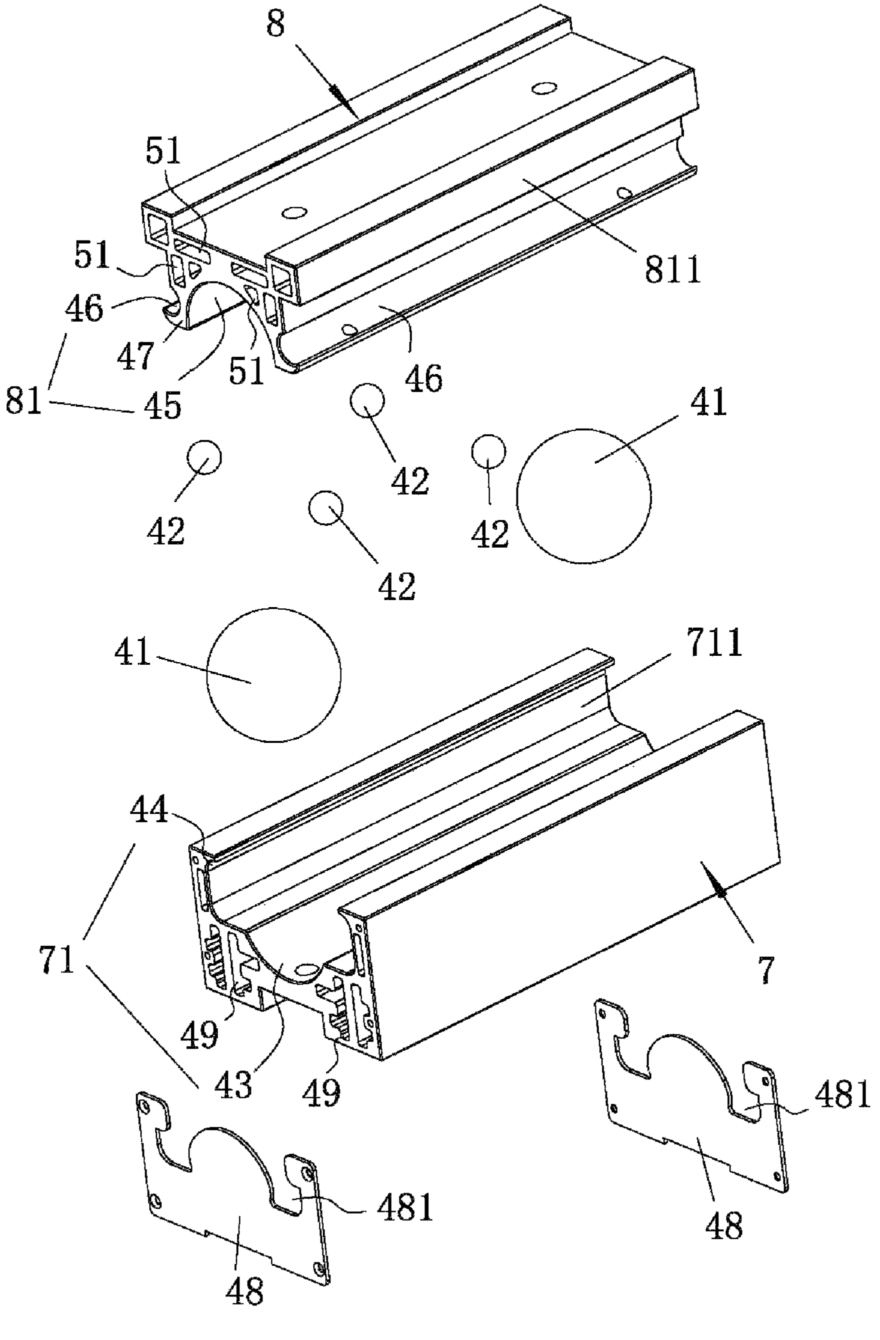
FIG. 5 is an exploded view of the rolling guide unit according to the embodiment of the present invention.
Figure 6:
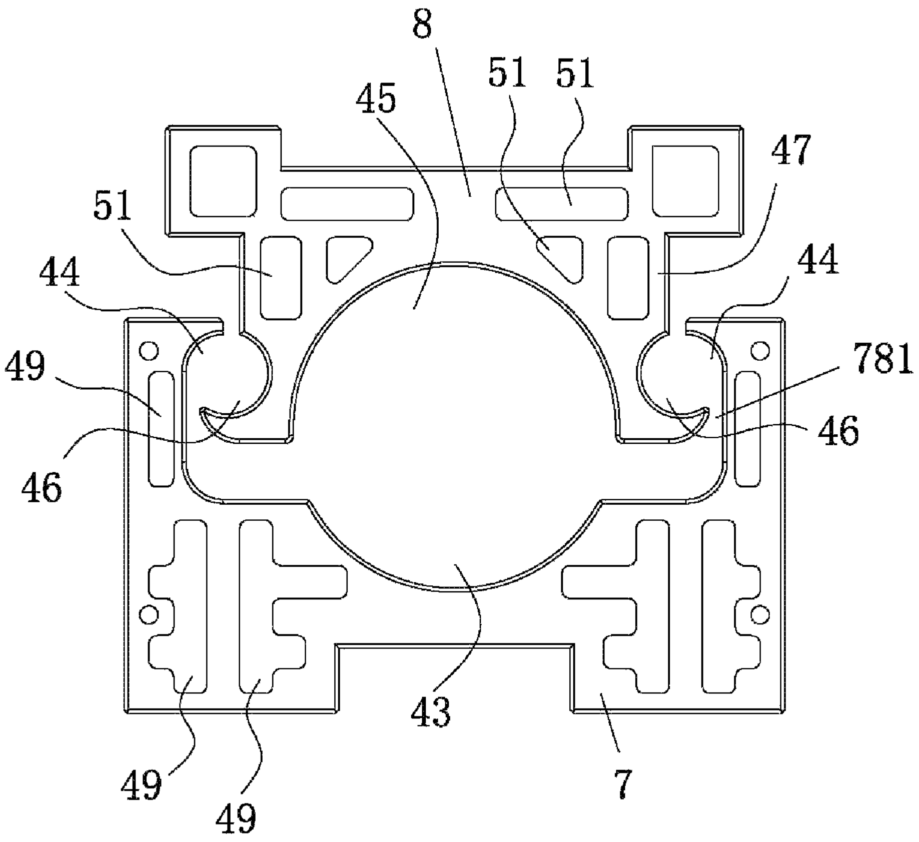
FIG. 6 is another perspective view of the rolling guide unit according to the embodiment of the present invention after the first roller, the second roller and the baffle are hidden.

As shown in FIG. 4 to FIG. 6, the rolling guide unit 4 includes a fixed base 7, a movable base 8 and a roller (not figured), the roller (not figured) is defined between the fixed base 7 and the movable base 8, the fixed base 7 is arranged on the fixed frame 1, the movable base 2 is arranged on the movable frame 8.

Refer to FIG. 5, the fixed base 7 includes a first slot 71, the first slot 71 is recessed from the outer side of the movable base 7, the movable base 8 is provided with a second slot 81, the second slot 81 cooperates with the first slot 71, the roller (not figured) is accommodated in the first slot 71 and the second slot 81. Two ends of each roller (not figured) are respectively received in the first slot 71 and the second slot 81, in other words, one end of the roller (not figured) is blocked via the inner surface of the first slot 71, the other end of the roller (not figured) is blocked via the inner surface of the second slot 81.

Depending on different actual needs, the shape and structure of the roller (not figured) is alternatively spherical or cylindrical or spindle-shaped or ellipsoidal, etc., as long as the roller (not figured) can roll back and forth in the first slot 71 and the second slot 81.

Along with FIG. 1, when in use, the users lie on the movable frame 2, the first driving member 3 drives the movable frame 2 to move backwards and forwards relative to the fixed frame 1, so that the movable frame 2 drives the users lying on the movable frame 2 shake. By means of rolling of the roller (not figured), the movable base 8 is rolled relative to the fixed base 7, which reduces the friction between the fixed frame 1 and the movable frame 2, delays their wear, and prolongs their service life; reduces vibration and friction and improves the operation stability. Therefore, it is ensured that the users can take physical exercises while sleeping and resting.

The second driving member 6 is arranged on the movable frame 2, when in use, the second driving member 6 drives the lifting frame 5 to move relative to the movable frame 2, then the lifting frame 5 is higher than the movable frame 2 so that the users can place their head or legs on the lifting frame 5.

The carrying frame 9 is detachably connected to the movable frame 2, the second driving member 6 is an electric push rod, the electric push rod is common in the prior art, the details will not be described here. One end of the lifting frame 5 is rotatably arranged on the carrying frame 9, a positioning end (i.e. a cylinder body of the electric push rod) of the second driving member 6 is rotatably arranged with the carrying frame 9, an output end (i.e. a piston rod of the electric push rod) of the second driving member 6 is rotatably arranged with the other end of the lifting frame 5.

By extending or retracting the piston rod of the electric push rod, the lifting frame 5 is driven to rotate clockwise or reversely relative to the carrying frame 9, and the angle between the lifting frame 5 and the carrying frame 9 is changed. When the lifting frame 5 rotates to the angle position required by the user, the electric push rod stops, and the user can lean his head or legs on the lifting frame 5.

The multifunctional vibration equipment with less noise of the present invention also includes a control unit (not shown), a remote controller (not shown) and a mattress assembly (not figured). The control unit (not shown) is alternatively installed on the fixed frame 1 or the movable frame 2 or the carrying frame 9, the first driving member 3 and the second driving member 6 are respectively electrically connected with the control unit (not shown), the remote controller (not shown) cooperates with the control unit (not shown) via wireless transmission to adjust the operating parameters of the first driving member 3 and the second driving member 6. According to actual needs, the remote controller (not shown) is alternatively a mobile intelligent terminal. In this case, it is necessary to install and set up application software (i.e. APP) on the mobile intelligent terminal, and the actual operation parameters of the first driver 3 and the second driver 6 are controlled via the application software.

The mattress assembly (not figured) includes a mattress 11 and a protection fence 12, the mattress 11 is arranged on the carrying frame 9 and the lifting frame 5, for example, the mattress 11 includes a sponge and a cloth sleeve or a leather sleeve, the cloth sleeve or the leather sleeve is covering the outer side of the sponge, and the users lie on the mattress 11. The protection fence 12 surrounds the periphery of the fixed frame 1, the movable frame 2, the carrying frame 9 and the lifting frame 5. Since the protection fence covers the lifting frame 5, the fixed frame 1 and the movable frame 2, it can avoid being exposed and affecting the appearance. Preferably, the protection fence 12 includes an elastic member 13 which covers the gap between the lifting frame 5 and the carrying frame 9. When the lifting frame 5 moves, the elastic member 13 always covers the above-mentioned gap.

Figure 2:
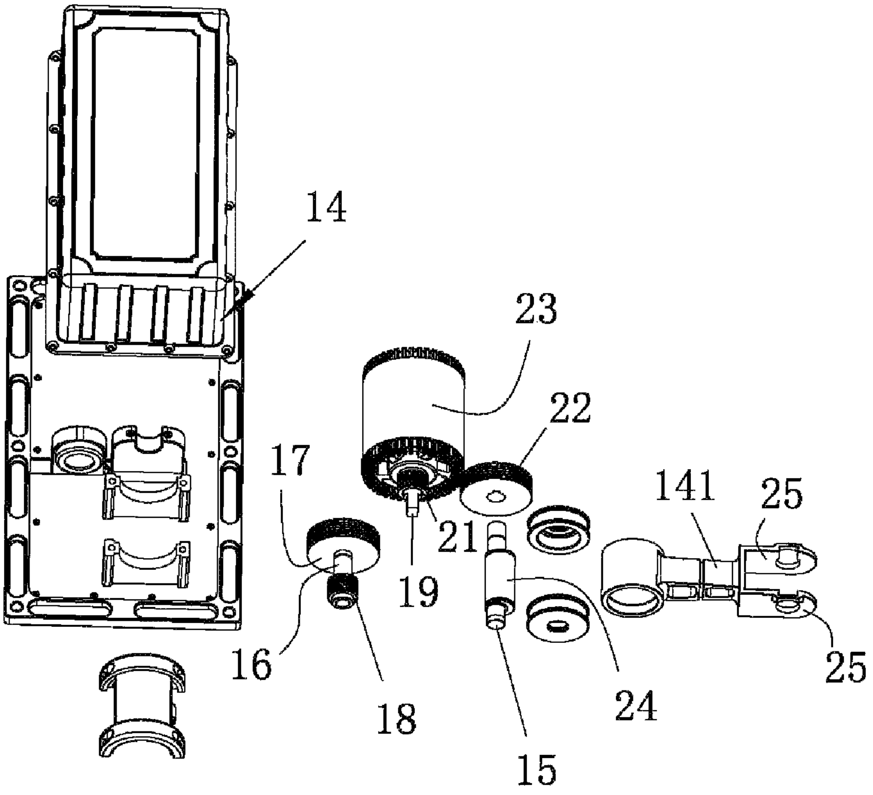
FIG. 2 is a partially exploded view of the first driving member according to the embodiment of the present invention.

Please refer to FIG. 2, the first driving member 3 includes a receiving box 14, an eccentric shaft 15, a driving motor 23 and a transmission link 141, the receiving box 14 is detachably connected to the fixed frame 1, the eccentric shaft 15 is rotatably arranged in the receiving box 14, the driving motor 23 is arranged in the receiving box 14 and drives the eccentric shaft 15 to rotate, the transmission link 141 is rotatably arranged with the eccentric shaft 15 and protrudes beyond the receiving box 14. In this embodiment, the first driving member 3 is an independent module, that is, the eccentric shaft 15, the driving motor 23, and the transmission link 141 are installed in the receiving box 14 to form the independent module. Then, the independent module is installed on the fixed frame 1 via the receiving box 14. In case the first driving member 3 is damaged, only the receiving box 14 and the fixed frame 1 need to be disassembled, which facilitates the disassembly and maintenance of the first driving member 3. One end of the transmission link 141 is defined in the receiving box 14, and the other end of the transmission link 141 protruding beyond the receiving box 14 is arranged on the movable frame 2.

Preferably, the first driving member 3 further includes a first shaft 16, a first pulley 17 and a second pulley 18, the first shaft 16 is rotatably arranged in the receiving box 14, the first pulley 17 and the second pulley 18 are respectively arranged on two ends of the first shaft 16 away from each other. The driving motor 23 includes a machine core (not shown) and a main shaft 19 rotatably arranged with the machine core (not shown), one end of the main shaft 19 protrudes beyond the machine core (not shown) and is rotatably arranged in the receiving box 14. The main shaft 19 is provided with a third pulley 21, the eccentric shaft 15 is provided with a fourth pulley 22. The first pulley 17 and the third pulley 21 are drivingly connected via a first belt (not shown), the second pulley 18 and the fourth pulley 22 are drivingly connected via a second belt (not shown. One end of the transmission link 141 is rotatably sleeved on the outside of the eccentric portion 24 of the eccentric shaft 15.

In this embodiment, the driving motor 23 is an external rotor motor, that is, the main shaft 19 and the outer rotor of the driving motor 23 are fixedly installed together. Because of the multi-drive transmission of the main shaft 19, the first shaft 16 and the eccentric shaft 15, the speed of the driving motor 23 is reduced. On one hand, the output torque of the driving motor 23 is increased to ensure that the driving motor 23 outputs enough driving force, so as to drive the movable base 8 to drive the movable frame 2 and the carrying frame 9 to reciprocate. On the other hand, the vibration frequency of the eccentric shaft 15 is reduced, which helps to improve the smoothness of the vibration equipment. According to actual needs, alternatively, the first shaft 16 can be eliminated. At the same time, the first driving member 3 is configured with the main shaft 19 and the eccentric shaft 15, the main shaft 19 and the eccentric shaft 15 are connected via a first-drive transmission to simplify the structural design.

The diameter of the first pulley 17 is greater than that of the third pulley 21, and the diameter of the second pulley 18 is smaller than that of the fourth pulley 22. The aforementioned pulley includes a plurality of annular blind grooves (not shown), the annular groove blind grooves are arranged around the rotation axis of the pulley, the annular grooves are recessed from the outer surface of the pulley, and the plurality of annular blind grooves are arranged in a row along the central axis of the pulley. The above-mentioned belt includes a plurality of annular ribs, and the plurality of annular ribs are respectively accommodated in the annular blind grooves of the pulley.

Figure 3:
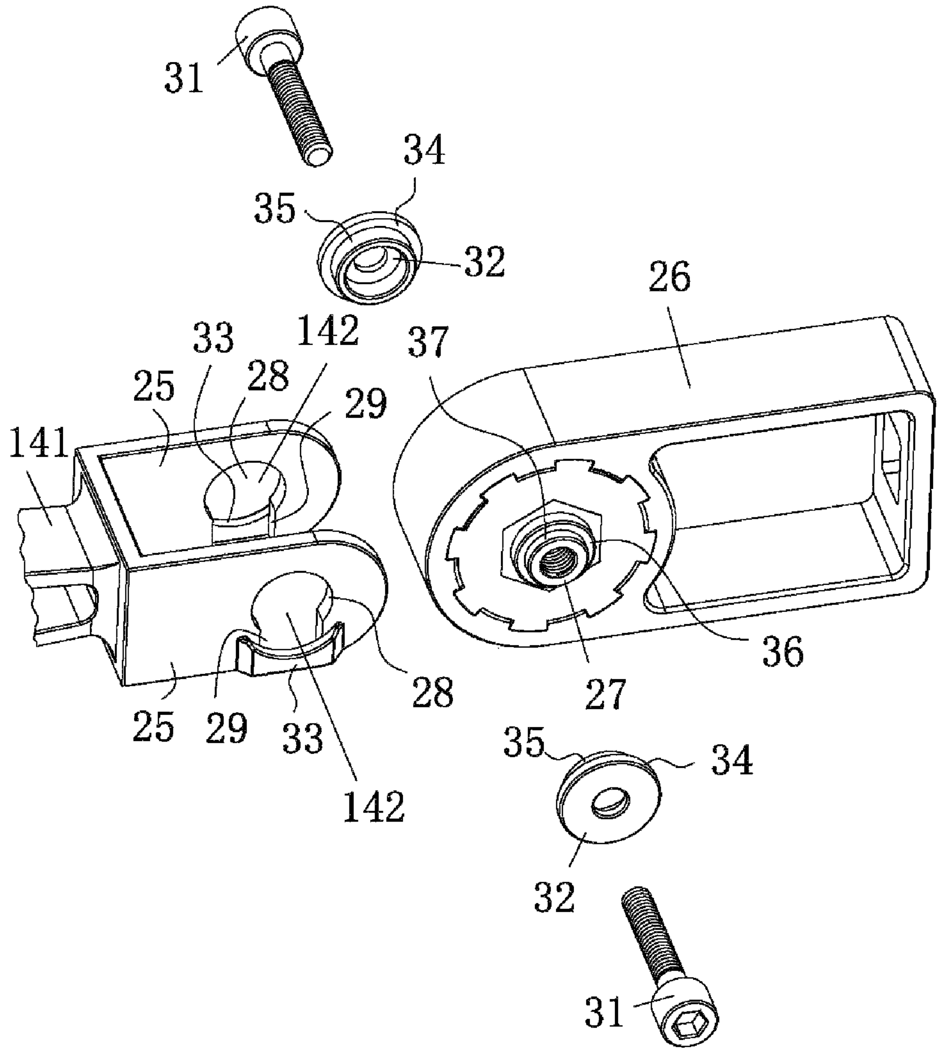
FIG. 3 is a schematic view of the transmission link, the mating member, the limiting member and the shaft sleeve member according to the embodiment of the present invention.

Please refer to FIG. 1 and FIG. 3, the first driving member 3 further includes a limiting member 31. The transmission link 141 includes two supporting plates 25, and the two supporting plates 25 are spaced apart from each other and arranged in parallel. The movable member 2 includes a mating member 26 and two protruding shafts 27, two protruding shafts 27 are respectively arranged on two opposite ends of the mating member 26 away from each other, the mating member 26 is located between the two supporting plates 25, the two supporting plates 25 are used to clamp and limit the mating member 26. The supporting plate 25 is provided with a notch 142 for accommodating the protruding shaft 27, The notch 142 passes through the supporting plate 25 along the thickness direction of the support plate 25, the limiting member 31 is used for limiting the supporting plate 25 on the mating member 26.

In the process of installing the first driving member 3 onto the movable frame 2, it is only necessary to clamp the two supporting plates 25 of the transmission link 141 on the matching member 26, then the protruding shaft 27 enters the notch 142, the mating member 26 is connected to the supporting plate 25 of the transmission link 141 via the limiting member 31, so as to realize quick installation. During disassembling, only the limiting member 31 needs to be disassembled, then the supporting plate 25 is separated from the mating member 26, which is convenient for disassembly.

The first driving member 3 further includes two shaft sleeve members 32, the notch 142 includes a circular hole 28 and a rectangular hole 29, the circular hole 28 is in the middle of the supporting plate 25, the rectangular hole 29 communicates with the circular hole 28 and passes through the side wall of the supporting plate 25, the protruding shaft 27 enters the rectangular hole 29 to reach the circular hole 28 when the supporting plate 25 and the mating member 26 are clamped during the installation process. Two shaft sleeve members 32 are respectively sheathed on the outer sides of the two protruding shafts 27, the protruding shafts 27 are positioned with the aid of the shaft sleeve members 32 so as to position the mating member 26.

Two shaft sleeve members 32 are rotatably accommodated in the circular holes 28, and the limiting member 31 passes through the shaft sleeve member 32 and the protruding shaft 27, and the limiting member 31 are arranged on the mating member 26. Preferably, the mating member 26 is provided with a threaded hole, the limiting member 31 is a bolt or a screw, and the limiting member 31 is screwed on the mating member 26.

Since the shaft sleeve member 32 is rotationally cooperated with the supporting plate 25, the relative rotation between the transmission link 141 and the mating member 26 generates a buffer when the first driving member 3 drives the movable frame 2 to move back and forth.

In this embodiment, a soft member (not shown) is provided on two sides of the mating member 26 away from each other, and the soft member (not shown) is sandwiched between the mating piece 26 and the supporting plate 25. The rigid contact between the supporting plate 26 and the mating member 26 is avoided due to the soft deformation characteristics of the soft member (not shown), the noise generated by the friction during the rotation is reduced.

The transmission link 141 further includes a connecting bridge 33 arranged on the supporting plate 25, the connecting bridge 33 is located on one side of the two supporting plates 25 away from each other, the connecting bridge 33 is approximately strip-shaped, two ends of the connecting bridge 33 are respectively arranged on the side walls of both sides of the rectangular hole 29; the strength of the supporting plate 25 is strengthened by the connecting bridge 33, the side walls of both sides of the rectangular hole 29 are prevented from being too close or far from each other.

The shaft sleeve member 32 includes a disc body 34 and an axle collar 35, the outer diameter of the axle collar 35 is smaller than that of the disc body 34; the protruding shaft 27 includes a base portion 36 and a shaft portion 37, the outer diameter of the base portion 36 is bigger than that of the shaft portion 37; the shaft sleeve member 32 is sleeved on the outside of the shaft portion 37, and one end of the axle collar 35 away from the disc body 34 abuts against the base portion 36.

The axle collar 35 is rotatably accommodated in the circular hole 28, one side of the disc body 34 close to the axle collar 35 abuts against the supporting plate 25, and the connecting bridge 33 abuts against the disc body 34, thus, the shaft sleeve member 32 is accurately and firmly positioned on the supporting plate 25.

As shown in FIG. 1 and FIG. 4, there are two rolling guide units 4, the first driving member 3 is located between the two rolling guide units 4, two ends of the movable frame 2 are respectively fixed on the movable base 8 of the two rolling guide units 4, the first driving member 3 acts on the middle of the movable frame 2.

During the movement of the movable frame 2 relative to the fixed frame 1, the left and right ends of the moving frame 2 away from each other are respectively supported via the two rolling units 4 to ensure that the two ends of the moving frame 2 are roughly balanced.

In this embodiment, there are four rolling guide units 4, two rolling units 4 are defined on the same side of the first driving member 3, two sides on the same end of the movable frame 2 far away from each other are respectively arranged on the movable base 8 provided with the two rolling guide units 4. That is, the front and rear sides on the left end of the movable frame 2 are respectively fixedly arranged on the movable base 8 provided with the two rolling units 4, the front and rear sides on the right end of the movable frame 2 are respectively fixedly arranged on the front and rear sides of the other two rolling units 4.

In this embodiment, the vibration equipment further includes a plurality of supporting legs (not shown), and the plurality of supporting legs (not shown) are respectively arranged under the fixed frame 1. The supporting leg (not shown) includes a threaded rod 38 and a cushion 39, the threaded rod 38 is screwed on the fixed frame 1, the cushion 39 is fixedly arranged on one end of the threaded rod 38 and is used for standing on the supporting surface.

In use, the fixed frame 1 of the vibration equipment needs to be placed on the supporting surface (such as the ground). Although the supporting surface is uneven, the user can appropriately adjust the actual height of the supporting leg, thus, the fixed frame 1 can be stably placed on the supporting surface with the help of the supporting legs the plurality of supporting legs. During the use of the vibration equipment, the cushion 39 is used to absorb the shock impact of the fixed frame 1 on the supporting surface. Based on actual needs, the cushion 39 is alternatively made of soft rubber.

The number of the rollers (not figured) is multiple, and the multiple rollers (not figured) are arranged in a row along the length direction of the slot (not figured). In this embodiment, there are two rollers (not figured), and the two rollers (not figured) are respectively located in the two ends of the slot. Of course, the number of roller (not figured) is alternatively three or four, etc. based on actual needs.

The fixed base 7 and/or the movable base 8 are provided with a spacer (not shown) located in the slot, the spacer is located between two adjacent rollers. The spacer (not shown) is arranged along the width direction of the slot, the spacer is arranged on the inner surface of the slot. The spacer (not shown) is used to separate two adjacent rollers (not figured) to avoid collision with each other, even leading to improper use. Of course, based on actual needs, when the number of rollers (not figured) is greater than or equal to three, the number of spacers is greater than or equal to two.

The rollers (not figured) are made of silica gel. Due to the elasticity of the silica gel, the noise of the relative movement between the fixed base 7 and the movable base 8 is further reduced, and "silent" use is realized. At the same time, the elasticity of the silica gel absorbs the vibration transmitted from the outside to the movable base 8 via the fixed base 7 to ensure that the movable base 8 run smoothly.

Certainly, the roller (not figured) is alternatively made of soft plastic based on actual needs. In addition, the roller (not figured) is alternatively comprised of a rigid member and an elastic leather sheath wrapped on the outer side of the rigid member. In the same way, the roller (not figured) is alternatively made of other soft materials. The purpose of the roller (not figured) is to reduce the noise of the roller (not figured) during the rolling movement.

As shown in FIG. 4 to FIG. 6, the pluralities of rollers (not figured) include a first roller 41 and a second roller 42, the first slot 71 includes a first guiding slot 43 and a second guiding slot 44, the first guiding slot 43 and the second guiding slot 44 are arranged in parallel. The second slot 82 includes a third guiding slot 45 and a fourth g guiding slot 46, the third guiding slot 45 is recessed from the bottom surface of the movable base 8, the fourth guiding slot 46 is recessed from the outer side of the movable base 8, the number of the fourth guiding slot 46 is two, two fourth guiding slots 46 are respectively provided on two ends of the movable base 8 far away from each other.

The upper and lower ends of the first roller 41 are respectively accommodated in the third guiding slot 45 and the first guiding slot 43, the upper end of the first roller 41 is accommodated in the third guiding slot 45, the lower end of the first roller 41 is accommodated in the first guiding slot 43. Because of the cooperation of the first guiding slot 43 and the third guiding slot 45, the first roller 41 is prevented from moving left and right relative to the fixed base 7 and the movable base 8, and the first roller 41 is prevented from moving up and down relative to the fixed base 7 and the movable base 8, as a result, the first roller 41 can only roll back and forth.

The left and right sides of the second roller 42 are respectively accommodated in the fourth guiding slot 46 and the second guiding slot 44. Because of the cooperation of the second guiding slot 43 and the fourth guiding slot 45, the second roller 42 is prevented from moving left and right relative to the fixed base 7 and the movable base 8. In addition, the second roller 42 is prevented from moving up and down relative to the fixed base 7 and the movable base 8 so that the second roller 42 can only roll back and forth relative to the fixed base 7 and the movable base 8.

The second rollers 42 are provided on the left and right sides of the movable base 8, each side of the movable base 8 has a plurality of the second rollers 42. The plurality of second rollers 42 on the same side of the movable base 8 are respectively arranged in a row along the length direction of the second guiding slot 44 and the length direction of the fourth guiding slot 46. Because of the second roller 42, on the one hand, the vibration generated when the movable base 8 moves left and right relative to the fixed base 7 is absorbed, on the other hand, the vibration generated when the movable base 8 moves up and down relative to the fixed base 7 is absorbed. At the same time, the movable base 8 is prevented from colliding when it moves left and right relative to the fixed base 7, and it is prevented from colliding when the moving base 8 moves up and down relative to the fixed base 7.

The outer diameter of the first roller 41 is greater than that of the second roller 42, the fixed frame 1 is fixedly connected to the fixed base 7, the movable frame 2 is fixedly connected to the movable base 8, the movable frame 2 is pressed on the first roller 41 via the movable base 8. In actual use, the first roller 41 is a bearing roller, and the second roller 42 is a limiting roller. By increasing the outer diameter of the first roller 41 and reducing the number of the first roller 41, and the structural design is simplified. Preferably, the outer diameter of the first roller 41 is at least greater than twice that of the second roller 42.

In this embodiment, the first roller 41 and the second roller 42 are both spherical, which facilitates the rolling of the rollers (not figured) between the fixed seat 7 and the movable seat 8. The inner surface of the slot (not figured) is a semi-concave arc surface matched with the rollers (not figured), and the outer surface of the rollers (not figured) rolls against the inner surface of the slot (not figured).

The fixed base 7 is provided with an accommodating blind groove 711, the accommodating blind groove 711 is recessed from the top surface of the fixed base 7. The movable base 8 includes a bearing portion 811 and a protrusion 47 provided on the lower portion of the bearing portion 811, the protrusion 47 is accommodated in the accommodating blind groove 711, there is a first clearance gap 781 between the protrusion 47 and the inner surface of the accommodating blind groove 711, the first clearance gap 781 is provided to avoid direct contact between the protrusion 47 and the fixed base 7. The third guiding slot 45 is recessed from one end of the protrusion 47 away from the bearing portion 811, the first guiding slot 43 is concavely formed from the bottom surface of the accommodating blind groove 711.

When assembled, the movable base 8 is inserted into the accommodating blind groove 711 along the length direction of the fixed base 7, the movable base 8 is not disengaged from the fixed base 7 along the up-down direction, the movable base 8 is not disengaged from the fixed seat 7 along the left and right directions.

The fourth guiding slot 46 is recessed from the outer surface of the protrusion 47, the second guiding slot 44 is concaved from the inner surface of the accommodating blind groove 711, the width of the second guiding slot 44 is greater than the outer diameter of the second roller 42.

The shape of the fourth guiding slot 46 coincides with that of the second roller 42, the width of the second guiding slot 44 (that is, the height of the second guiding slot 44 on the fixed base 7) is greater than 1.5 times that of the second roller 42.

The width of the bearing portion 811 is greater than the width of the protrusion 47, and the bearing portion 811 is substantially a rectangular flat plate. The left and right ends of the bearing portion 811 protrude from the left and right ends of the protrusion 47 respectively, there is a second clearance gap between the bearing portion 811 and the fixed base 7. The second clearance gap is provided to avoid direct contact between the bearing portion 811 and the fixed base 7.

Two stoppers 48 are respectively arranged at both ends of the fixed base 7, and the stoppers 48 are used to stop the rollers in the slot, the stopper 48 is provided with a receding groove 481 passing through the stopper 48, and the movable base 8 protrudes beyond the stopper 48 via the receding groove 481. Due to the stopper 48, all the rollers are enclosed in the first slot 71 and the second slot 81 of the fixed base 7 to prevent the rollers from falling fall from the space between the fixed base 7 and the movable base 8.

The fixed base 7 is provided with a first blanking groove 49, the first blanking groove 49 is arranged in isolation from the first slot 71. That is, the first blanking groove 49 are not communicating with the first slot 71, the first blanking groove 49 and the first slot 71 are arranged in parallel. Based on actual needs, the number of the first blanking grooves 49 of the fixed base 7 is alternatively multiple, and the plurality of first blanking grooves 49 are symmetrically arranged with respect to the central axis of the fixed base 7.

The movable base 8 is provided with a second blanking groove 51, the second blanking groove 51 is arranged in isolation from the second slot 81. That is, the second blanking groove 51 are not communicating with the second slot 81, the second blanking groove 51 and the second slot 81 are arranged in parallel. Based on actual needs, the number of the Based on actual needs, the number of the second blanking grooves 51 of the movable base 8 is alternatively multiple, and the plurality of second blanking grooves 51 are symmetrically arranged with respect to the central axis of the movable base 8.

Based on the structural design of the blanking grooves, on one hand, the raw materials and the manufacturing cost is reduced, on the other hand, "reinforcing ribs" are formed on the side walls of the blanking grooves, thereby enhancing the strength of the fixed base 7 and the strength of the movable base 8, improving the deformation resistance of the fixed base 7 and the movable base 8, thus, the service life of the fixed base 7 and the movable base 8 is prolonged, and the stability of the performance of fixed base 7 and mobile base 8 is ensured.

The above embodiments, which are intended to enable those skilled in the art to understand the content of the disclosure and implement it accordingly, are merely for describing the technical concepts and features of the disclosure, and the scope of patent application of the disclosure cannot be defined only by the embodiments, i.e., any equivalent variations or modifications made in accordance with the spirit disclosed by the disclosure still fall within the scope of claims of the disclosure.

What is claimed is:

1. A multifunctional vibration equipment with less noise, comprising:

- a fixed frame;
- a movable frame, the moveable frame is movably arranged relative to the fixed frame;
- a first driving member, the first driving member is arranged on the fixed frame, the first driving member drives the movable frame to move backwards and forwards relative to the fixed frame; and
- a rolling guide unit, wherein, the rolling guide unit includes a fixed base, a movable base and a roller, the movable base is movably arranged relative to the fixed base, the roller is defined between the fixed base and the movable base, the fixed base is arranged on the fixed frame, the movable frame is arranged on the movable base; the fixed base is provided with a first slot, the movable frame is provided with a second slot, the second slot cooperates with the first slot, two ends of the roller are respectively accommodated in the first slot and the second slot, the movable base rolls on the fixed base via the roller.

2. The multifunctional vibration equipment as defined in claim 1, wherein further includes a lifting frame and a second driving member, the second driving member is arranged on the movable frame, the second driving member drives the lifting frame to move relative to the movable frame.

3. The multifunctional vibration equipment as defined in claim 2, wherein further includes a carrying frame, the carrying frame is detachably connected to the movable frame, the second driving member is an electric push rod, one end of the lifting frame is rotatably arranged on the carrying frame, a positioning end of the second driving member is rotatably arranged with the carrying frame, an output end of the second driving member is rotatably arranged with the other end of the lifting frame.

4. The multifunctional vibration equipment as defined in claim 1, wherein the first driving member includes a receiving box, an eccentric shaft, a driving motor and a transmission link, the receiving box is detachably connected to the fixed frame, the eccentric shaft is rotatably arranged in the receiving box, the driving motor is arranged in the receiving box and drives the eccentric shaft to rotate, the transmission link is rotatably arranged with the eccentric shaft and protrudes beyond the receiving box, one end of the transmission link protruding beyond the receiving box is arranged on the movable frame.

5. The multifunctional vibration equipment as defined in claim 4, wherein further includes a limiting member, the transmission link is equipped with two supporting plates, the movable frame includes a mating member and two protruding shafts, two protruding shafts are respectively arranged on two opposite ends of the mating member away from each other, the mating member is located between the two supporting plates, the supporting plate is provided with a notch for accommodating the protruding shaft, the limiting member is used for limiting the supporting plate on the mating member.

6. The multifunctional vibration equipment as defined in claim 5, wherein further includes two shaft sleeve members, the notch includes a circular hole and a rectangular hole, the circular hole is in the middle of the supporting plate, the rectangular hole communicates with the circular hole and passes through the side wall of the supporting plate, the protruding shaft enters the rectangular hole to reach the circular hole; two shaft sleeve members are respectively sheathed on the outer sides of the two protruding shafts, two shaft sleeve members are rotatably accommodated in the circular holes, and the limiting member passes through the shaft sleeve member and the protruding shaft, and the limiting member are arranged on the mating member.

7. The multifunctional vibration equipment as defined in claim 6, wherein the transmission link further includes a connecting bridge arranged on the supporting plate, the connecting bridge is located on one side of the two supporting plates away from each other, two ends of the connecting bridge are respectively arranged on the side walls of both sides of the rectangular hole; the shaft sleeve member includes a disc body and an axle collar, the outer diameter of the axle collar is smaller than that of the disc body; the protruding shaft includes a base portion and a shaft portion, the outer diameter of the base portion is bigger than that of the shaft portion; the shaft sleeve member is sleeved on the outside of the shaft portion, and one end of the axle collar away from the disc body abuts against the base portion; the axle collar is rotatably accommodated in the circular hole, one side of the disc body close to the axle collar abuts against the supporting plate, and the connecting bridge abuts against the disc body.

8. The multifunctional vibration equipment as defined in claim 1, wherein the number of the rollers is plural, the pluralities of rollers are arranged along the length direction of the first slot and the second slot, the pluralities of rollers include a first roller and a second roller, the first slot includes a first guiding slot and a second guiding slot, the second slot includes a third guiding slot and a fourth g guiding slot, the third guiding slot is recessed from the bottom surface of the movable base, the fourth guiding slot is recessed from the outer side of the movable base, the number of the fourth guiding slot is two, the two fourth guiding slots are respectively provided on two ends of the movable base far away from each other; two ends of the first roller are respectively accommodated in the third guide groove and the first guide groove, two ends of the second roller are respectively accommodated in the fourth guiding slot and the second guiding slot, the second roller is located on the left and right sides of the movable base.

9. The multifunctional vibration equipment as defined in claim 8, wherein the fixed base is provided with an accommodating blind groove, the movable base includes a bearing portion and a protrusion provided on the bearing portion, and the protrusion is accommodated in the accommodating blind groove, there is a first clearance gap between the protrusion and the inner surface of the accommodating blind groove, the third guiding slot is recessed from one end of the protrusion away from the bearing portion, the first guiding slot is concavely formed from the bottom surface of the accommodating blind groove.

10. The multifunctional vibration equipment as defined in claim 1, wherein two baffles are respectively defined on two sides of the fixed base, the baffle is used to block the roller in the first slot and the second slot, the baffle is provided with a receding groove through the baffle, the movable base protrudes beyond the baffle through the relief groove.

11. A multifunctional vibration equipment, comprising:

a fixed frame;

a movable frame, the moveable frame is movably arranged relative to the fixed frame;

a first driving member, the first driving member is arranged on the fixed frame, the first driving member drives the movable frame to move backwards and forwards relative to the fixed frame; and a rolling guide unit, wherein, the rolling guide unit includes a fixed base, a movable base and a roller, the movable base is movably arranged relative to the fixed base, the roller is defined between the fixed base and the movable base, the fixed base is arranged on the fixed frame, the movable frame is arranged on the movable base, the movable base rolls on the fixed base via the roller; wherein further includes a lifting frame and a second driving member, the second driving member is arranged on the movable frame, the second driving member drives the lifting frame to move relative to the movable frame.

12. The multifunctional vibration equipment as defined in claim 11, the fixed base is provided with a first slot, the movable base is provided with a second slot, the second slot cooperates with the first slot, two ends of the roller are respectively accommodated in the first slot and the second slot.

13. The multifunctional vibration equipment as defined in claim 12, wherein the number of the rollers is plural, the pluralities of rollers are arranged along the length direction of the first slot and the second slot, the pluralities of rollers include a first roller and a second roller, the first slot includes a first guiding slot and a second guiding slot, the second slot includes a third guiding slot and a fourth-g-guiding slot, the third guiding slot is recessed from the bottom surface of the movable base, the fourth guiding slot is recessed from the outer side of the movable base, the number of the fourth guiding slot is two, the two fourth guiding slots are respectively provided on two ends of the movable base far away from each other; two ends of the first roller are respectively accommodated in the third guide groove and the first guide groove, two ends of the second roller are respectively accommodated in the fourth guiding slot and the second guiding slot, the second roller is located on the left and right sides of the movable base.

14. The multifunctional vibration equipment as defined in claim 12, two baffles are respectively defined on two sides of the fixed base, the baffle is used to stop the roller in the first slot and the second slot, the baffle is provided with a receding groove through the baffle, the movable base protrudes beyond the baffle through the relief groove.

15. The multifunctional vibration equipment as defined in claim 11, the first driving member includes a receiving box, an eccentric shaft, a driving motor and a transmission link, the receiving box is detachably connected to the fixed frame, the eccentric shaft is rotatably arranged in the receiving box, the driving motor is arranged in the receiving box and drives the eccentric shaft to rotate, the transmission link is rotatably arranged with the eccentric shaft and protrudes beyond the receiving box, one end of the transmission link protruding beyond the receiving box is arranged on the movable frame.

16. The multifunctional vibration equipment as defined in claim 15, wherein further includes a limiting member, the transmission link is equipped with two supporting plates, the movable frame includes a mating member and two protruding shafts, two protruding shafts are respectively arranged on the opposite ends of the mating member away from each other, the mating member is located between the two supporting plates, the supporting plate is provided with a notch for accommodating the protruding shaft, the limiting member is used for limiting the supporting plate on the mating member.

17. The multifunctional vibration equipment as defined in claim 16, wherein further includes two shaft sleeve members, the notch includes a circular hole and a rectangular hole, the circular hole is in the middle of the supporting plate, the rectangular hole communicates with the circular hole and passes through the side wall of the supporting plate, the protruding shaft enters the rectangular hole to reach the circular hole; two shaft sleeve members are respectively sheathed on the outer sides of the two protruding shafts, two shaft sleeve members are rotatably accommodated in the circular holes, and the limiting member passes through the shaft sleeve member and the protruding shaft, and the limiting member are arranged on the mating member.

18. The multifunctional vibration equipment as defined in claim 11, wherein further includes a carrying frame, the carrying frame is detachably connected to the movable frame, the second driving member is an electric push rod, one end of the lifting frame is rotatably arranged on the carrying frame, a positioning end of the second driving member is rotatably arranged with the carrying frame, an output end of the second driving member is rotatably arranged with the other end of the lifting frame.

19. A multifunctional vibration equipment, comprising:

a fixed frame;

a movable frame, the moveable frame is movably arranged relative to the fixed frame;

a first driving member, the first driving member is arranged on the movable frame, the first driving member drives the movable frame to move backwards and forwards relative to the fixed frame; and a rolling guide unit, wherein, the rolling guide unit includes a fixed base, a movable base and a roller, the movable base is movably arranged relative to the fixed base, the roller is defined between the fixed base and the movable base, the fixed base is arranged on the fixed frame, the movable base is arranged on the movable frame; the fixed base is provided with a first slot, the movable base is provided with a second slot, the second slot cooperates with the first slot, two ends of the roller are respectively accommodated in the first slot and the second slot, the movable base rolls on the fixed base via the roller.

* * * * *